United States Patent
Biess et al.

(10) Patent No.: US 6,839,508 B2
(45) Date of Patent: Jan. 4, 2005

(54) FUEL HEATER

(75) Inventors: Lawrence J. Biess, Jacksonville, FL (US); Christer T. Gotmalm, Sault Ste Marie (CA)

(73) Assignee: CSXT Intellectual Properties Corporation, Jacksonville, FL (US)

( * ) Notice: Subject to any disclaimer, the term of this patent is extended or adjusted under 35 U.S.C. 154(b) by 0 days.

(21) Appl. No.: 10/273,260

(22) Filed: Oct. 18, 2002

(65) Prior Publication Data

US 2004/0076413 A1 Apr. 22, 2004

(51) Int. Cl.[7] .................................................. F24H 1/34
(52) U.S. Cl. ..................... 392/462; 165/142; 123/549; 219/205
(58) Field of Search ................................. 392/465, 466, 392/480, 468; 219/205, 206, 207, 208; 165/41, 42, 47, 142, 144, 145, 155; 123/549, 557

(56) References Cited

U.S. PATENT DOCUMENTS

| | | | |
|---|---|---|---|
| 3,768,730 A | * 10/1973 | Campbell | ................. 236/93 R |
| 4,326,491 A | 4/1982 | Burchett | |
| 4,372,279 A | * 2/1983 | Parks | ......................... 123/557 |
| 4,385,615 A | 5/1983 | Keane | |
| 4,440,138 A | 4/1984 | Smith | |
| 4,499,886 A | 2/1985 | Hinds | |
| 4,585,924 A | * 4/1986 | Pakula | ....................... 219/205 |
| 4,684,786 A | * 8/1987 | Mann et al. | ................ 392/441 |
| 4,971,018 A | 11/1990 | Ray | |
| 4,979,483 A | 12/1990 | Ray | |
| 5,029,634 A | 7/1991 | Hurner | |
| 5,135,044 A | 8/1992 | Hurner | |
| 5,158,131 A | 10/1992 | Hurner | |
| 5,443,053 A | 8/1995 | Johnson | |
| 5,806,479 A | 9/1998 | Bauer et al. | |

* cited by examiner

Primary Examiner—Thor Campbell
(74) Attorney, Agent, or Firm—Pillsbury Winthrop LLP

(57) ABSTRACT

A fuel heater for a tank includes an elongated member that fits through an opening in the tank. The elongated member includes a first tube that defines a fuel channel and ends with a bottom fuel intake. Fuel may be drawn from the tank and conveyed by a supply side line coupled to the first tube. A second tube of the elongated member is coupled to a return side line that conveys warmed fuel back to the tank. A third tube substantially coaxially surrounds the first tube, and an outlet of the second tube enters the third tube. A heat trace may be employed to warm the fuel. Accordingly, the temperature of fuel in the tank may be maintained above the cloud point temperature.

28 Claims, 3 Drawing Sheets

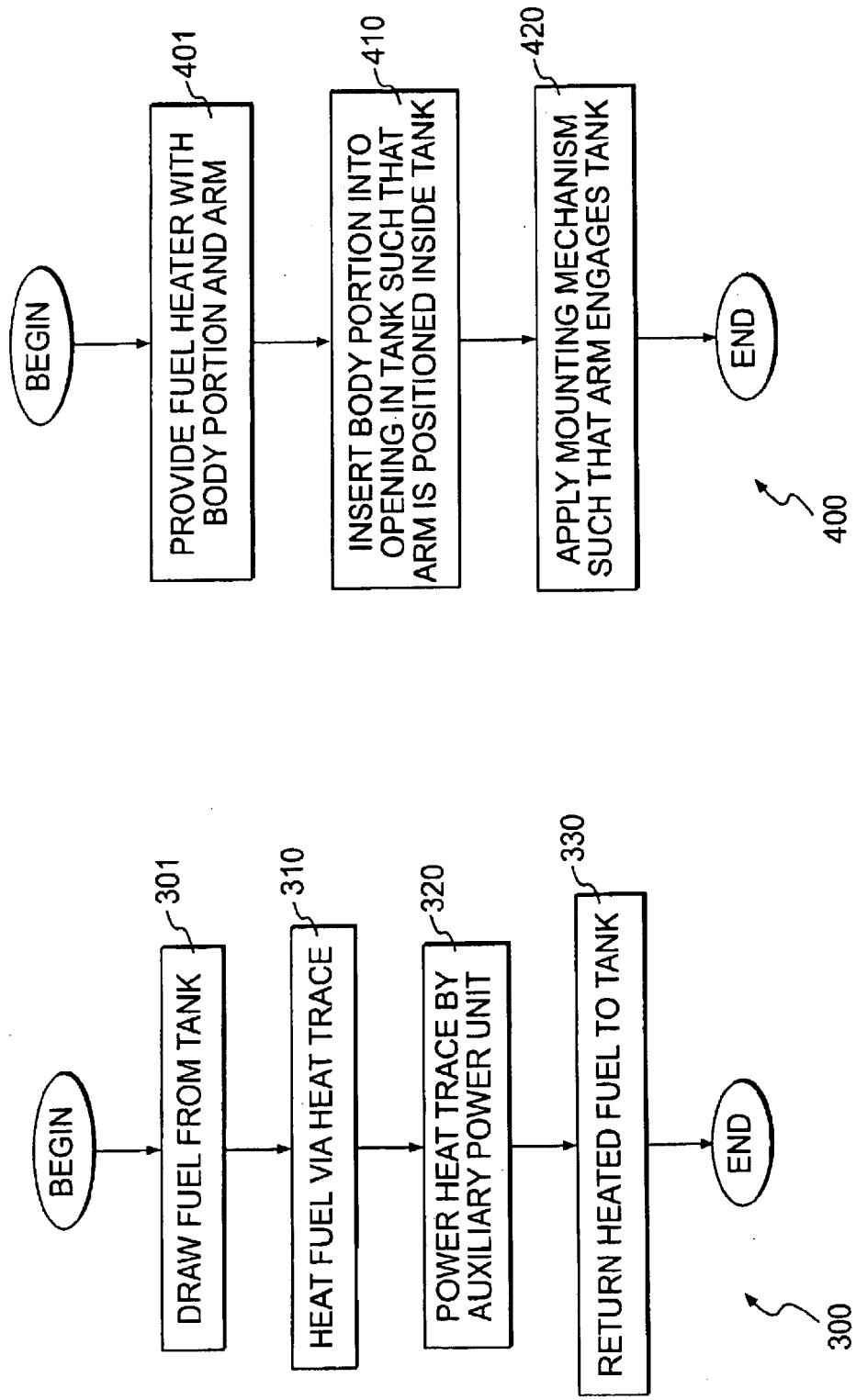

FUEL HEATER

BACKGROUND

1. Field

Embodiments of the present invention relate to heat exchangers.

2. Description of Related Art

In diesel fuel powered transportation environments, extremely cold temperatures adversely affect diesel engine operation. Generally, large diesel engines, such as locomotive engines, are not shut down during cold weather conditions due to the difficulty in restarting such engines. Diesel engines do not have the benefit of an electrical spark to generate combustion and must rely on heat generated by compressing air in order to ignite fuel in the engine cylinders.

In low temperature conditions (ambient temperatures below about 40° F., for example), various factors contribute to the difficulty in starting a diesel engine. For instance, cold ambient air drawn into the engine must be increased in temperature sufficiently to cause combustion. Additionally, diesel fuel tends to exhibit poor viscous qualities at low temperatures. Moreover, in extremes of cold, diesel fuel tends to gel, thus making engine operation difficult.

When locomotives are operated in cold climates, high viscosity and wax clouding of the cold diesel fuel tend to clog fuel filters and fuel injection nozzles. Viscosity also may affect injector lubrication. Fuels with low viscosity may not provide sufficient lubrication for the precision fit of fuel injection pumps or injector plungers, resulting in leakage or increased wear. Fuels that do not meet viscosity requirements can lead to performance complaints. Fuel atomization is also affected by fuel viscosity. Diesel fuels with high viscosity tend to form larger droplets on injection, which can cause poor combustion and increased exhaust smoke and emissions.

In recent years, higher boiling point wax fractions have been used in diesel fuels. Such wax fractions tend to more readily crystallize out in engine parts and fuel lines, making engine starting and operating even more difficult.

Existing fuel heaters are complex, unwieldy, and not optimally effective. Accordingly, there is a growing need for an improved fuel heater.

BRIEF DESCRIPTION OF THE DRAWINGS

FIG. 3 is a flowchart of a method according to an embodiment of the present invention.

FIG. 4 is a flowchart of a method according to an embodiment of the present invention.

DETAILED DESCRIPTION

Embodiments of the present invention provide for an automatic fuel heater and associated methods.

In one embodiment, a fuel heater includes an elongated member that fits through an opening in a fuel tank. The elongated member includes a fuel suction channel and a return channel. Fuel is drawn from the tank, warmed, and returned to the tank.

In an embodiment, the elongated member includes a first tube, a second tube, and a third tube. The first tube defines a fuel channel and ends with a bottom fuel intake. Fuel may be drawn from the tank and conveyed by a supply side line coupled to the first tube. The second tube is coupled to a return side line that conveys warmed fuel back to the tank. The third tube substantially coaxially surrounds the first tube, and an outlet of the second tube enters the third tube.

In other embodiments, a heat trace may be employed to heat fuel drawn from, and returning to, the tank. The heat trace may be powered by a power source, such as an auxiliary power unit of an engine. Accordingly, temperature of fuel in the tank may be maintained above the cloud point temperature, that is, the temperature at which paraffins precipitate.

In accordance with various embodiments herein, fuel consumption is not adversely affected by heating of fuel in the tank. On the contrary, fuel consumption and concomitant emissions are improved. In addition, no separate heating fluid is needed to effectuate fuel heating.

In another embodiment, a fuel heater includes an arm member that extends laterally outwardly from an elongated member of the fuel heater. The arm member may fit through an opening in a tank. A holding member may hold the arm member against the tank. As such, a fuel heater may be mounted to a tank without the need for special hardware, such as brackets screwed into the tank.

In various embodiments, the temperature of fuel adjacent to the fuel suction intake of a fuel heater is maintained above the cloud point temperature. The temperature of fuel surrounding the fuel heater may be similarly maintained. Thus, waxing of fuel in a fuel tank may be prevented.

Figure 1:
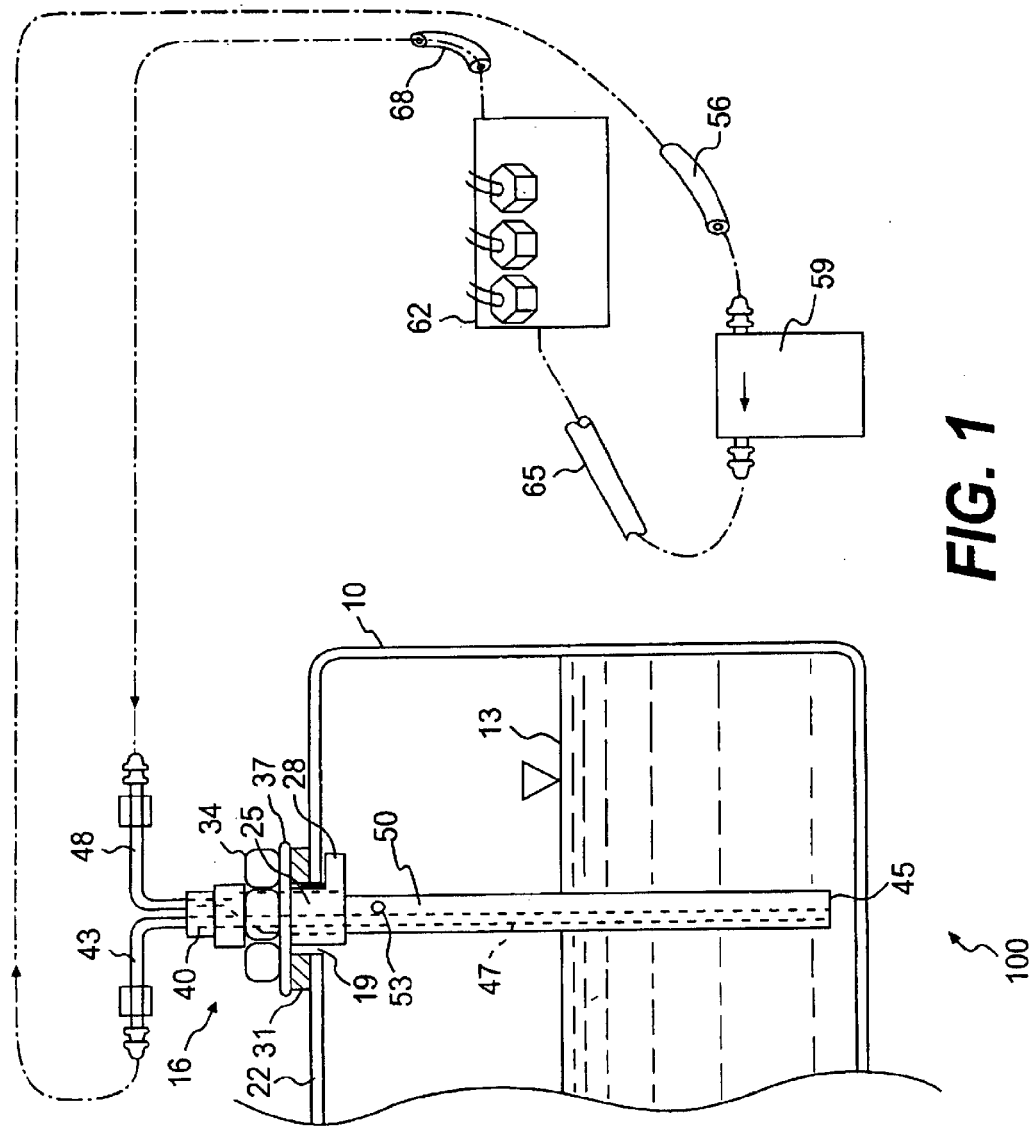
FIG. 1 illustrates a system according to an embodiment of the present invention.

FIG. 1 illustrates a system 100 according to an embodiment of the present invention. System 100 includes a fuel tank 10, a fuel heater assembly 16, a fuel pump 59, and an engine injection system 62.

System 100 may be implemented in a locomotive, for example. However, system 100 may also be implemented in other environments, such as diesel engines found in mobile off-road or stationary power plants.

Tank 10 may contain diesel fuel 13 or another kind of fuel. Where system 100 is implemented in other contexts, tank 10 may contain other kinds of fluids that need to be kept warm. Tank 10 includes a top panel 22 with an opening 19.

Fuel heater assembly 16 is mounted on tank 10. Fuel heater assembly 16 includes a body portion 25 and a short arm 28 extending out from a side of body portion 25. Arm 28 fits under top panel 22 of tank 10.

In one embodiment, fuel heater assembly 16 is mounted on tank 10 as a thru-hull fitting. In particular, body portion 25 is threaded above arm 28. An elastomeric gasket 31 is compressed on the upper side of top panel 22 with a nut 34 threaded onto body portion 25 and a washer 37. When nut 34 is tightened sufficiently, gasket 31 and arm 28 respectively engage outer and inner sides of top panel 22. As such, a seal is formed around opening 19 of tank 10.

It is to be appreciated that other mounting mechanisms for body portion 25 may be employed in accordance with embodiments of the present invention. For instance, O-rings, clamps, bolts, plates, threaded adapters, or weldments may be employed.

A tight plug 40 is positioned at an end of body portion 25. Two small tubes are fitted in plug 40. A first tube 43 goes through plug 40 and down to near the bottom of tank 10. A fuel intake opening 45 is at the bottom of first tube 43. First tube 43 provides a fuel suction channel 47 to draw fuel for heating. Thus, first tube 43 acts as a supply side line for fuel.

A second tube 48 provides a fuel return channel that ends open in the interior of plug 40. Thus, second tube 43 acts as a return side line for fuel. A third and larger tube, shroud 50, extends from the bottom of body portion 25. Shroud 50 is fitted to the lower end of plug 40, surrounding fuel suction channel 47 such that return fuel from second tube 48 flows into shroud 50 and down into tank 10. A small hole 53 in shroud 50 below plug 40 allows vapor or air in the return fuel to escape to the surface of the contained fuel in tank 10.

First tube 43 is fitted with a suction hose 56. Hose 56 is connected to fuel pump 59. Pump 59 is connected to engine injection system 62 via a conduit 65. Engine injection system 62 is connected to second tube 48 via a return hose 68. It is to be understood that connections between or among first tube 43, second tube 48, pump 59, or injection system 62 may be direct or indirect, and fuel may pass through other mechanisms (not shown), such as filters, in some embodiments. Connections may be implemented via rigid or flexible conduits, such as hoses.

Pump 59 draws fuel 13 from tank 10 at fuel intake opening 45 of fuel heater assembly 16. Pump 59 discharges drawn fuel, under pressure, to injection system 62 via conduit 65. In some embodiments, fuel pump 59 may draw fuel from tank 10 on a constant basis. Fuel from injection system 62, which may be warmed by engine surfaces, flows through return hose 68 back to second tube 48 of fuel heater assembly 16. The warmed fuel may be excess recycled fuel that was not burned by the engine associated with tank 10.

In certain embodiments, warmed fuel returning to second tube 48 may be bled of gases in shroud 50 and may flow down to fuel intake opening 45 in first tube 43. Such unburned recycled fuel transfers heat along the length of fuel suction channel 47 and may combine with fuel 13 in tank 10. Accordingly, a sphere of warmed fuel is formed in tank 10. The warmed fuel does not wax.

Figure 2:
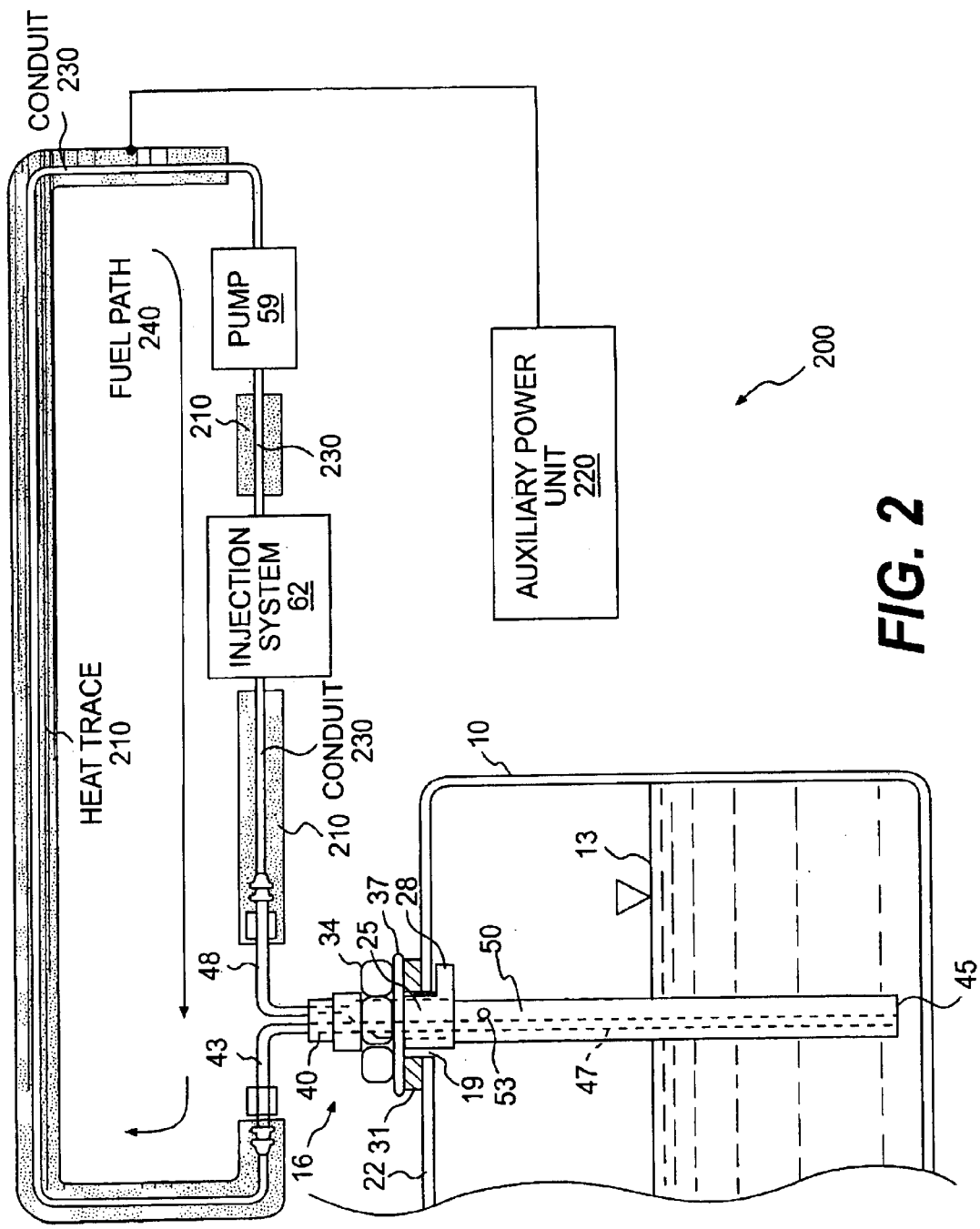
FIG. 2 illustrates a system according to an embodiment of the present invention.

FIG. 2 illustrates a system 200 according to an embodiment of the present invention. System 200 includes a fuel tank 10, a fuel heater assembly 16, a fuel pump 59, and an engine injection system 62. These system components are described above. System 200 also includes a heat trace 210, an auxiliary power unit 220, and fuel conduit(s) 230.

Fuel path 240 represents an exemplary path taken by fuel drawn from tank 10, warmed, and returned to tank 10.

Fuel conduit(s) 230 convey fuel to and from various components in system 200. It is to be understood that various types of conduit(s) 230 may be employed at various points along fuel path 240. For instance, hoses, pipes, and other flexible or rigid conduits may be employed as appropriate.

Heat trace 210 is operatively coupled with conduit(s) 230 along all or a portion of fuel path 240. Heat trace 210 may be implemented as one or more independent or interconnected heat traces. Heat trace may include insulation, such as, for example, an insulating outer sheathing or tubing. Heat trace 210 heats fuel conveyed by conduit(s) 230 as the fuel traverses fuel path 240 between first tube 43 and second tube 48 of fuel heat assembly 16. In an embodiment, heat trace 210, insulation thereof, and conduit(s) 230 may form a hose assembly.

In an exemplary implementation, heat trace 210 is a 120 vac or 240 vac heat trace. Power for heat trace 210 may be provided by a power source, such as a battery or a connection to an electrical outlet. In a particular embodiment, power for heat trace 210 may be provided all or partially by an auxiliary power unit for an engine, such as that disclosed in U.S. Pat. No. 6,470,844.

In other embodiments, heat trace 210 or additional heat trace may heat one or more filters and/or a pre-heater of an oil system (not shown) in system 200. As such, fuel waxing also may be reduced in the oil system of a collocated engine(s), such as a main engine that is shut down for standby purposes.

FIG. 3 is a flowchart of a method 300 of heating fuel in a tank according to an embodiment of the present invention. In task 301, fuel is drawn from a tank that is outfitted with a fuel heater assembly. In task 310, the fuel is heated via a heat trace and/or other heating mechanisms or surfaces. The heat trace is powered by an auxiliary power unit (task 320). In task 330, the heated fuel is returned to the tank.

FIG. 4 is a flowchart of a method 400 of mounting a fuel heater in a tank according to an embodiment of the present invention. In task 401, a fuel heater with a body portion and an arm is provided. In task 410, the body portion is inserted into an opening in the tank such that the arm is positioned inside the tank. In task 420, a mounting mechanism is applied to the body portion such that the arm engages the tank and the body portion is secured in the opening in the tank.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

For instance, various embodiments may be used in conjunction with other fuel heating techniques or systems, such as 12 or 74 volt direct current systems, heated/recirculated water, and collocated main and auxiliary engine fuel supply and return lines, to effectively maintain desired temperatures.

While specific values, relationships, materials and steps have been set forth for purposes of describing concepts of the invention, it should be recognized that, in the light of the above teachings, those skilled in the art can modify those specifics without departing from basic concepts and operating principles of the invention taught herein. Therefore, for purposes of determining the scope of patent protection, reference shall be made to the appended claims in combination with the above detailed description.

What is claimed is:

1. An apparatus, comprising:
   an elongated member constructed and arranged to fit through an opening in a tank, the elongated member having,
   a first tube defining a fuel channel passing through a plug, the plug constructed and arranged to at least in part fit in the opening, the first tube extending along at least some of a length of the elongated member, a portion of the first tube defining a fuel intake, the first tube being operatively coupled to a supply side line;
   a second tube having an outlet, the second tube being operatively coupled to a return side line; and
   a third tube substantially and coaxially surrounding the first tube, wherein the outlet of the second tube enters the third tube; and
   a heat trace constructed and arranged to heat fuel of the tank.

2. The apparatus of claim 1, wherein the supply side line is operatively coupled to a fuel pump.

3. The apparatus of claim 1, wherein the supply side line at least in part comprises a hose.

4. The apparatus of claim 1, wherein the return side line is operatively coupled to a fuel system constructed and arranged to re-circulate fuel to the tank.

5. The apparatus of claim 1, wherein the return side line at least in part comprises a hose.

6. The apparatus of claim 1, wherein the heat trace is operatively coupled with at least one of the supply side line and the return side line.

7. The apparatus of claim 6, wherein the at least one of the supply side line and the return side line is operatively coupled with an insulator.

8. The apparatus of claim 7, wherein the insulator comprises a tubular portion.

9. The apparatus of claim 6, wherein an auxiliary power unit provides, at least in part, power for the heat trace.

10. The apparatus of claim 1, wherein the third tube has an opening therein, the opening defining an exit path for vapor or air in fuel returned to the tank.

11. The apparatus of claim 1, further comprising a mounting member constructed and arranged to mount the elongated member through the opening.

12. The apparatus of claim 11, wherein the mounting member comprises:

an arm member extending laterally outwardly from the elongated member, the arm member being constructed and arranged to fit through the opening; and a holding member constructed and arranged to hold the elongated member in the tank.

13. The apparatus of claim 12, wherein:

the elongated member is at least threaded above the arm member; and the holding member comprises a nut constructed and arranged to be screwed on the elongated member.

14. The apparatus of claim 1, further comprising a gasket constructed and arranged to form a seal around the elongated member.

15. The apparatus of claim 1, wherein the tank is mounted on a locomotive.

16. The apparatus of claim 1, wherein the tank holds diesel fuel.

17. The apparatus of claim 1, wherein a temperature of at least a portion of fuel in the tank is maintained above a cloud point temperature.

18. A method of heating fuel in a tank, comprising:

taking fuel from a tank, the fuel being conveyed by a supply side line operatively coupled to a first tube of an elongated member positioned in an opening of the tank, the first tube having a fuel intake portion;

heating the fuel, at least in part, with a heat trace;

returning the heated fuel to the tank, the returning fuel being conveyed by a return side line operatively coupled to a second tube of the elongated member; and powering the heat trace, at least in part, by an auxiliary power unit, where heating the fuel includes heating the fuel in the return side line.

19. The method of claim 18, wherein the tank is mounted on a locomotive.

20. The method of claim 18, wherein at least one of the supply side line and the return side line is operatively coupled with an insulator.

21. The method of claim 20, wherein the insulator comprises a tubular portion.

22. The method of claim 18, wherein a fuel pump operatively coupled to the supply side line takes fuel from the tank.

23. The method of claim 18, wherein a fuel system operatively coupled to the return side line returns fuel to the tank.

24. A method of mounting a fuel heater in a tank, comprising:

providing an elongated member and an arm member extending laterally outwardly from the elongated member, the arm member being constructed and arranged to fit through an opening in the tank;

inserting the elongated member into the opening, wherein the arm member is positioned inside the tank; and applying a holding member to the elongated member, wherein the holding member is constructed and arranged to hold the elongated member in the tank.

25. The method of claim 24, wherein:

the elongated member is threaded above the arm member; and the holding member comprises a nut.

26. The method of claim 24, wherein the holding member comprises a gasket.

27. An apparatus, comprising:

means for taking fuel from a tank, the fuel being conveyed by supply side means for supplying fuel from the tank, the fuel taking means including intake means for receiving the fuel, the fuel taking means being at least in part positioned in an opening in the tank;

a heat trace constructed and arranged to heat the fuel, the heat trace being powered by means for powering the heat trace;

means for returning the heated fuel to the tank, the heated fuel being conveyed by return side means for conveying fuel to the tank; and means for mounting at least a portion of the fuel taking means and fuel returning means in the opening, wherein the heat trace is constructed and arranged to heat the fuel in the return side means.

28. The apparatus of claim 27, wherein the mounting means include means for holding at least a portion of the fuel taking means and fuel returning means in the tank.

* * * * *